US008629634B2

(12) United States Patent
Redler

(10) Patent No.: US 8,629,634 B2
(45) Date of Patent: Jan. 14, 2014

(54) APPARATUS AND METHOD FOR OPTIMIZING CURRENT USE DURING CONTROL OF MULTIPLE MOTORS

(76) Inventor: Yesaiahu Redler, Pardesia (IL)

(*) Notice: Subject to any disclaimer, the term of this patent is extended or adjusted under 35 U.S.C. 154(b) by 206 days.

(21) Appl. No.: 13/246,063

(22) Filed: Sep. 27, 2011

(65) Prior Publication Data

US 2012/0074876 A1 Mar. 29, 2012

Related U.S. Application Data

(63) Continuation-in-part of application No. PCT/IL2010/000278, filed on Apr. 6, 2010.

(30) Foreign Application Priority Data

Feb. 1, 2010 (IL) .......................................... 203642

(51) Int. Cl.
H02P 5/00 (2006.01)
(52) U.S. Cl.
USPC ............. 318/41; 318/599; 318/811; 318/810; 318/34; 318/432; 318/434; 318/807
(58) Field of Classification Search
USPC ........ 318/811, 34, 41, 599, 400.01, 700, 812, 318/432, 434, 810, 807
See application file for complete search history.

(56) References Cited

U.S. PATENT DOCUMENTS

| | | | |
|---|---|---|---|
| 5,241,250 A | 8/1993 | Nagasawa et al. | |
| 5,498,947 A * | 3/1996 | Wang et al. | 318/811 |
| 5,869,946 A | 2/1999 | Carobolante | |
| 5,920,160 A * | 7/1999 | Yamada et al. | 318/9 |
| 5,933,344 A * | 8/1999 | Mitsuishi et al. | 700/13 |
| 5,955,851 A | 9/1999 | Solie et al. | |
| 6,057,664 A * | 5/2000 | Ikawa et al. | 318/811 |
| 6,297,610 B1 | 10/2001 | Bauer et al. | |
| 6,586,898 B2 * | 7/2003 | King et al. | 318/400.34 |
| 6,774,600 B2 | 8/2004 | Weinbrenner | |
| 6,812,656 B2 | 11/2004 | Donnelly et al. | |
| 6,936,982 B2 | 8/2005 | Diesner et al. | |
| 7,154,300 B2 | 12/2006 | Anders et al. | |
| 7,463,003 B2 * | 12/2008 | Toyonaga et al. | 318/625 |
| 7,606,624 B2 * | 10/2009 | Cullen | 700/29 |
| 8,089,232 B2 * | 1/2012 | Itagaki et al. | 318/400.11 |
| 2002/0005304 A1 | 1/2002 | Bachman et al. | |
| 2003/0037665 A1 | 2/2003 | Rupert et al. | |
| 2003/0160586 A1 | 8/2003 | Donnelly et al. | |
| 2006/0043915 A1 | 3/2006 | Kim | |

OTHER PUBLICATIONS

International Search Report and Written Opinion dated Aug. 17, 2010 in corresponding International Application No. PCT/IL/2010/000278.

* cited by examiner

*Primary Examiner* — Rita Leykin
(74) *Attorney, Agent, or Firm* — The Law Office of Michael E. Kondoudis

(57) ABSTRACT

A method for is disclosed for using pulse-width modulated (PWM) signals in the control of a plurality of electric motors or of at least one electric motor with multiple windings. The method comprises steps of: measuring the current being drawn by each of said electric motors; transmitting signals corresponding to the current being drawn said plurality of motors to a central controller; transmitting from said central controller signals corresponding to the amount of current to be drawn by each motor, whereby the relative phases and durations of said signals are distributed according to a predetermined protocol; and repeating steps (a) through (c) while said electric motors are in operation. The distribution of PWM signals defines the total current drawn from said source of electricity as a function of time.

30 Claims, 10 Drawing Sheets

APPARATUS AND METHOD FOR OPTIMIZING CURRENT USE DURING CONTROL OF MULTIPLE MOTORS

REFERENCE TO RELATED APPLICATIONS

This application is a Continuation-in-Part of PCT Application No. PCT/IL2010/000278, filed 6 Apr. 2010, which claims priority from U.S. Provisional Application No. 61/164,924, filed 31 Mar. 2009, and from Israel Pat. Appl. No. 203642, filed 1 Feb. 2010, all of which are incorporated herein in their entirety.

FIELD OF THE INVENTION

The present invention relates to control of multiple electrical motors, in particular the use of pulse-width modulation to optimize the use current drawn from the power source driving the motors.

BACKGROUND OF THE INVENTION

Maximum power efficiency in electric vehicles is achieved when each wheel is driven by its own motor. That is, in this maximally efficient arrangement, power is applied directly to each wheel rather than via connections via a mechanical shaft and gears to a single motor. In typical designs, each wheel acts as a stand-alone unit, and the power drawn by each wheel is drawn from the battery according to the needs of the motor driving that wheel. Thus, the power required by each wheel is not synchronized with the best flow of current from the battery. This design can wear out the battery and reduce the battery lifetime due to increased internal dynamic resistance within the battery.

U.S. Pat. No. 5,241,250 discloses a servomotor system for multiple-axis motors. It teaches the use of pulse-width modulation for controlling the current delivered to the motors, but does not consider the problem of having to orient simultaneously multiple motors. Numerous patents (e.g. U.S. Pat. Nos. 5,869,946; 5,955,851; 6,297,610; 6,774,600; 6,812,656; 6,936,982; U.S. Pat. Appl. 2003-0160586) teach methods of regulating the total current delivered to a multi-phase DC motor, e.g. by pulse-width modulation, such that no individual phase is overloaded. U.S. Pat. No. 7,154,300 discloses a servo-motor system for multiple axes, but does not provide any specific means for preventing excessive demands being made on the power source as described above, nor does it teach a method for insuring that the motors reach their desired positions.

U.S. Pat. No. 6,057,664 (henceforth '664) discloses a motor driving control unit and method that comprises inter alia a current control section that takes a measured output current and then outputs a voltage instruction to a PWM section from the detected current value, a current instruction from an external device, and from a positional signal of an encoder connected to a motor. The apparatus and method disclosed in '664 do not provide any means for low-level synchronization of multiple motors (or of multiple windings of a single motor). Additionally, as the apparatus disclosed in '664 reads current as a parameter, it provides no means for superposition of phases. Nor does the apparatus disclosed in '664 provide a central PWM controller; every PWM in the system is a separate unit.

Thus, there is a long-felt need for a method for synchronizing the power demands of the wheels of the vehicle with the optimal current output of the battery.

Furthermore, there exists a long-felt need for an apparatus that can provide simultaneous, independent, accurate axial speed and positional control to a plurality of motors, said apparatus also designed to optimize the amount of current delivered to the servomotor system that controls the speeds and/or positions of the motors. Similarly, there exists a long-felt need for a method of controlling the speeds and/or 1 positions of a plurality of motors such that the axial position or speed of each motor can be controlled independently and accurately, which optimizes the current delivered to each servomotor system, and which ensures that the maximum total current required by the system never exceeds the maximum current that the power source can provide without experiencing a significant voltage drop.

SUMMARY OF THE INVENTION

The present invention is designed to meet these long-felt needs. A multi-axis motor controller (MAMC) is provided that contains means for synchronized pulse-width modulation (PWM) output. The MAMC controls the phase timing and appearance of each bridge driver of the PWM current pulses to each motor of a multiple motor system or to each winding of a multiple-winding single motor. PWM synchronization enables timing of the motor controllers such that the current drawn by the system is optimized for the best battery conditions. Control of the frequency, position (alignment), width, and phase of the PWM signals for each motor (or winding) leads to optimal utilization of the potential of the battery such that the current drawn is not excessive at one point in time and too low at another.

The present invention further discloses an apparatus and method for speed and axial positioning of DC motors (normal brush motors or brushless motors). The entire system is under the control of a single component (ASIC or FPGA). The current delivered to each servomotor controlling the axial position or speed of the motor is controlled by using pulse-width modulation (PWM). This technique uses a square wave the duty cycle of which is modulated, e.g. by producing the square wave via comparison of a sawtooth wave with a comparison sine wave such that the value of the square wave ("high" or "low") is determined by which of the two waves (sawtooth or comparison) is greater. The advantage of PWM as a switching device is that resistive losses are minimized, since the output signal is either "high," corresponding to an "on" state in which the voltage drop across the switch is (ideally) zero, or "low," corresponding to an "off" state in which no current is flowing.

In additional embodiments of the invention, the apparatus and method is used to control a multiple-winding motor. In embodiments in which the system or method is used to control a single motor with multiple windings, rather than multiple MAMC agents (one per motor), a logic bridge controlling a plurality of drivers (one per winding) is used, and the "MAMC controller" is in these embodiments a multiple-winding rather than a multiple-axis controller.

It is therefore an object of the present invention to disclose a method for using pulse-width modulated signals in the control of the electric current drawn from a source of electricity by a system comprising (a) a motor subsystem chosen from the group consisting of (1) a plurality of electric motors and (2) at least one motor with multiple windings; (b) said source of electricity; (c) measuring means for measuring the current being drawn by each of said plurality of electric motors or each of said windings; (d) current controlling means for controlling the current being drawn by each of said plurality of electric motors or said at least one motor with multiple windings; (e) a central controller adapted to provide pulse-width modulated (PWM) signals; and (f) transmitting means for transferring signals between said central controller and said current controlling means, said method comprising steps of: (a) measuring separately the current being drawn by each of said plurality of electric motors or said at least one motor with multiple windings; (b) transmitting to said central controller, according to a predetermined sequence, a plurality of signals, each one of said plurality of signals corresponding to the current being drawn by one of said plurality of motors or said windings; (c) transmitting, according to a predetermined sequence, at least one PWM signal from said central controller to each of said current controlling means, each of said at least one PWM signals corresponding to the amount of current to be drawn by the motor or winding, whereby the relative phases and durations of said at least one PWM signals are distributed according to a predetermined protocol; and, (d) repeating steps (a) through (c) while said motor or motors are in operation. It is within the essence of the invention wherein the distribution of PWM signals defines the total current drawn from said source of electricity as a function of time.

It is a further object of this invention to disclosed such a method, wherein said system further comprises a plurality of MAMC agents in cases when said motor subsystem comprises a plurality of motors, each of said MAMC agents adapted to transfer signals to and from said central controller and to control at least one of said motors, and said system comprises a logic bridge and driver in cases when said motor subsystem comprises a motor with multiple windings, said logic bridge and driver adapted to transfer signals to and from said central controller and to control at least one of said windings, and further wherein said method further comprises steps of: (a) transmitting, according to a predetermined sequence, a plurality of signals, each one of said plurality of signals corresponding to the current being drawn by one of said plurality of motors, from at least one of said plurality of MAMC agents to said central controller when said system comprises a plurality of MAMC agents, and from said logic bridge and driver when said subsystem comprises a logic bridge and driver; (b) transmitting at least one signal from said central controller to each of said plurality of MAMC agents when said system comprises a plurality of MAMC agents, each of said signals corresponding to the amount of current to be drawn by the motor being controlled by the agent receiving said signal, whereby the relative phases and durations of said signals are distributed according to a predetermined protocol; (c) transmitting at least one signal from said central controller to said logic bridge and driver when said system comprises a logic bridge and driver, each of said signals corresponding to the amount of current to be drawn by the winding being controlled by the driver receiving said signal, whereby the relative phases and durations of said signals are distributed according to a predetermined protocol; and (d) repeating the previous steps while said electric motors are in operation. It is within the essence of the invention wherein the distribution of PWM signals defines the total current drawn from said source of electricity as a function of time according to a predetermined protocol.

It is a further object of this invention to disclose a method for using pulse-width modulated signals in the control of the electric current drawn by a system comprising a source of electricity, a plurality of electric motors, a central controller adapted to provide pulse-width modulated (PWM) signal, and a plurality of MAMC agents, each of said MAMC agents adapted to transfer signals to and from said central controller and to control at least one of said motors, said method comprising steps of: (a) measuring separately the current being drawn by each of said plurality of electric motors; (b) transmitting, according to a predetermined sequence, a plurality of signals, each one of said plurality of signals corresponding to the current being drawn by one of said plurality of motors, from at least one of said plurality of MAMC agents to said central controller; (c) transmitting from said central controller to each of said plurality of MAMC agents at least one signal, each of said signals corresponding to the amount of current to be drawn by the motor being controlled the agent receiving said signal, whereby the relative phases and durations of said signals are distributed according to a predetermined protocol; and (d) repeating steps (a) through (c) while said plurality of electric motors are in operation. It is within the essence of the invention wherein the distribution of PWM signals defines the total current drawn from said source of electricity as a function of time according to a predetermined protocol.

It is a further object of this invention to disclose such a method as defined in any of the above, wherein said central controller is adapted to provide signals chosen from the group consisting of (a) PWM signals and (b) timing signals, wherein the distribution of signals provided by said central controller defines the total current drawn from said source of electricity as a function of time.

It is a further object of this invention to disclose such a method as defined in any of the above, wherein said distribution of PWM signals defines the total current drawn from said source of electricity to be substantially constant.

It is a further object of this invention to disclose such a method as defined in any of the above, wherein said distribution of PWM signals defines the total current drawn from said source of electricity as a series of pulses, the maxima, durations, timing, and shapes of which are determined according to a predetermined protocol.

It is a further object of this invention to disclose such a method as defined in any of the above, wherein said distribution of PWM signals defines the total current drawn from said source of electricity as a series of pulses, the maxima, durations, timing, frequency and shapes of which are determined according to a predetermined protocol.

It is a further object of this invention to disclose such a method, wherein said protocol defining the total current drawn from said source of electricity is chosen from the groups consisting of the three previously listed protocols.

It is a further object of this invention to disclose such a method as defined in any of the above, wherein said distribution of PWM signals comprises a series of pulses produced at a predetermined fixed frequency.

It is a further object of this invention to disclose such a method as defined in any of the above, wherein said distribution of PWM signals comprises a series of pulses produced at a variable frequency.

It is a further object of this invention to disclose such a method as defined in any of the above, wherein said distribution of PWM signals comprises a series of pulses chosen from the group consisting of (a) a series of pulses produced at a predetermined fixed frequency, and (b) a series of pulses produced at a variable frequency.

It is a further object of this invention to disclose such a method as defined in any of the above, wherein said variable frequency is produced according to a predetermined protocol whereby the current drawn from said source of electricity is substantially constant with time.

It is a further object of this invention to disclose such a method as defined in any of the above, wherein said distribution of PWM signals defines the total current drawn such that the total instantaneous current does not exceed a predetermined maximum value.

It is a further object of this invention to disclose such a method as defined in any of the above, wherein said distribution of PWM signals defines the total current drawn such that the total instantaneous current does not fall below a predetermined minimum value.

It is a further object of this invention to disclose such a method as defined in any of the above, wherein said distribution of PWM signals defines the total current drawn such that the lifetime of said source of electric current is extended beyond the lifetime of the source of electric current in a system otherwise substantially identical to but being controlled by a method other than that defined above.

It is a further object of this invention to disclose such a method as defined in any of the above, wherein said step of transmitting, according to a predetermined sequence, a plurality of signals, each one of said plurality of signals corresponding to the current being drawn by one of said plurality of motors, from at least one of said plurality of MAMC agents to said central controller further comprises the additional steps of (a) defining a network cycle comprising at least one segment during which data is transmitted; (b) defining static segment within each network cycle, said static segment comprising a fixed period of time during which deterministic data is transmitted; and (c) transmitting said plurality of signals sequentially from said plurality of agents during each static segment.

It is a further object of this invention to disclose such a method as defined in any of the above, wherein said step of transmitting, according to a predetermined sequence, a plurality of signals further comprises the additional steps of (a) defining a network cycle comprising at least one segment during which data is transmitted; (b) defining static segment within each network cycle, said static segment comprising a fixed period of time during which deterministic data is transmitted; and (c) transmitting said plurality of signals sequentially from said plurality of agents during each static segment.

It is a further object of this invention to disclose such a method, further comprising an additional step of transmitting data in a dynamic segment following said static segment within each network cycle.

It is a further object of this invention to disclose such a method, further comprising an additional step of transmitting network maintenance and/or timing signals during a symbol window following said dynamic segment.

It is a further object of this invention to disclose such a method, wherein each network cycle further comprises a predetermined idle time.

It is a further object of this invention to disclose such a method, further comprising an additional step of synchronizing node clocks during said idle time.

It is a further object of this invention to disclose such a method as defined in any of the above, wherein said motor subsystem comprises a plurality of motors, further comprising additional steps of (a) measuring at least one of (1) acceleration along at least one axis, (2) temperature, and (3) slipping rate of each of said plurality of electric motors; and, (b) transmitting the at least one value obtained in said step of measuring from at least one of said plurality of MAMC agents to said central controller.

It is a further object of this invention to disclose such a method as defined in any of the above, further comprising steps of (a) measuring at least one of (1) acceleration along at least one axis, (2) temperature, and (3) slipping rate of each of said electric motors; and, transmitting the at least one value obtained in the previous step from at least one of said plurality of MAMC agents when said system comprises a plurality of MAMC agents, and from said logic bridge when said system comprises a logic bridge, to said central controller.

It is a further object of this invention to disclose such a method as defined in any of the above, further comprising additional steps of (a) measuring the acceleration along at least one axis; (b) calculating the slipping rate of at least one of said plurality of motors; and (c) transmitting at least one value obtained in said step of calculating the slipping rate of at least one of said plurality of motors from at least one of said plurality of MAMC agents to said central controller.

It is a further object of this invention to disclose such a method as defined in any of the above, further comprising steps of (a) measuring the acceleration along at least one axis; (b) calculating the slipping rate of at least one of said motors from said measured acceleration; and (c) transmitting at least one value obtained in said step of calculating the slipping rate of at least one of said motors from at least one of said plurality of MAMC agents when said system comprises a plurality of MAMC agents, and from said logic bridge when said system comprises a logic bridge, to said central controller.

It is a further object of this invention to disclose such a method, wherein said motor subsystem comprises a plurality of motors, and further wherein said step of transmitting from said central controller to each of said plurality of MAMC agents at least one signal further comprises the additional step of transmitting a signal to at least one of said plurality of MAMC agents whereby the direction of rotation of at least one of said plurality of electric motors is reversed.

It is a further object of this invention to disclose such a method, wherein said distribution of PWM signals is adapted to reverse said direction of rotation of at least one of said plurality of electric motors whereby braking of said motors occurs without slipping.

It is a further object of this invention to disclose such a method as defined in any of the above, wherein said DC motors are brushless DC motors.

It is a further object of this invention to disclose such a method as defined in any of the above, adapted to control the motors that control the wheels of an electric vehicle.

It is a further object of this invention to disclose such a method as defined in any of the above, adapted to control the motors that control the canards (fins) of a projectile.

It is a further object of this invention to disclose an apparatus for using pulse-width modulated (PWM) signals to provide control to a plurality of electric motors, said apparatus connectable to a plurality of electric motors and comprising a multi-axis motor controller (MAMC), said MAMC comprising (a) a synchronized pulse-width modulation (PWM) controller adapted for providing PWM signals to said plurality of electric motors; and (b) communications means adapted to transmit signals from said MAMC to said plurality of motors and to receive signals transmitted from said plurality of electric motors to said MAMC. It is within the essence of the invention wherein the relative phases of said PWM signals are distributed according to a predetermined protocol.

It is a further object of this invention to disclose an apparatus for using pulse-width modulated (PWM) signals to provide control to a motor system, said apparatus connectable to a motor system comprising at least one of the group consisting of (a) a plurality of electric motors each of which has a single winding; (b) at least one electric motor with multiple windings; and (c) a plurality of electric motors, at least one of which has multiple windings; wherein said apparatus comprises, when said motor system comprises a plurality of motors, a multi-axis motor controller (MAMC), said MAMC comprising (a) a synchronized pulse-width modulation (PWM) controller adapted for providing PWM signals to said plurality of electric motors; and (b) communications means adapted to transmit signals from said MAMC to said plurality of motors and to receive signals transmitted from said plurality of electric motors to said MAMC; and further wherein said apparatus comprises, when said motor system comprises a motor with multiple windings, a logic bridge and driver, said logic bridge and driver comprising (a) a synchronized pulse-width modulation (PWM) controller adapted for providing PWM signals to said plurality of electric motors; and (b) communications means adapted to transmit signals from said logic bridge and driver to said windings and to receive signals transmitted from said windings to said logic bridge and driver; whereby the relative phases of said PWM signals are distributed according to a predetermined protocol.

It is a further object of this invention to disclose such an apparatus as defined in any of the above, further comprising at least one boost capacitor in electrical connection with the source of electricity for said plurality of electric motors.

It is a further object of this invention to disclose such an apparatus as defined in any of the above, wherein said predetermined protocol is chosen such that the current demand upon the source of electricity powering said plurality of electric motors cannot exceed the maximum current said source of electricity is capable of providing.

It is a further object of this invention to disclose such an apparatus as defined in any of the above, wherein said communications means comprises a two-way signal bus between said MAMC and said plurality of motors.

It is a further object of this invention to disclose such an apparatus as defined in any of the above, wherein said communications means comprises a two-way signal bus between said MAMC or logic bridge and said plurality of motors and/or multiple windings.

It is a further object of this invention to disclose such an apparatus as defined in any of the above, wherein said communication means comprises a plurality of drivers or MAMC agents, each of said drivers of MAMC agents connected via at least one two-way data transfer bus to said central controller, each of said drivers or MAMC agents further adapted to transmit control signals and to transmit data to said central controller.

It is a further object of this invention to disclose such an apparatus, further comprising a plurality of bridges adapted to transmit signals from said drivers or MAMC agents to said plurality of electric motors.

It is a further object of this invention to disclose such an apparatus as defined in any of the above, further comprising: (a) set point means connectable to said plurality of electric motors, said set point means adapted for providing to said plurality of electric motors at least one set point representing the desired value of at least one parameter related to the status of said plurality of electric motors; and (b) status determining means adapted for determining the actual status of said at least one parameter; and wherein said communications means comprises: (c) status transmitting means adapted for transmitting said actual status of said at least one parameter to said central controller; and (d) control signal transmitting means adapted for transmitting control signals from said driver or MAMC to said set point means.

It is a further object of this invention to disclose such an apparatus, wherein said at least one parameter is chosen from the group consisting of (a) the desired axial position of each of said motors; (b) the desired linear position of each of said motors; and (c) the desired speed of each of said motors.

It is a further object of this invention to disclose such an apparatus, wherein said status is the amount of electric current being drawn, and further wherein the phases of said PWM signals are distributed according to a protocol that defines the total current being drawn from said source of electricity as a function of time according to a predetermined form.

It is a further object of this invention to disclose such an apparatus, wherein said status determining means comprises at least one means chosen from the group consisting of (a) means for measuring temperature; (b) means for measuring acceleration along at least one axis; (c) means for measuring slippage; and (d) means for calculating slippage.

It is a further object of this invention to disclose such an apparatus, wherein said status transmitting means comprises a feedback mechanism for reporting said actual values of said at least one parameter; wherein said pulse-width modulated signal provides optimal current to motor control means without exceeding the maximum current that said power source is capable of providing.

It is a further object of this invention to disclose such an apparatus as defined in any of the above, wherein said electric motors are brushless DC motors.

It is a further object of this invention to disclose such an apparatus as defined in any of the above, adapted for use in an electric vehicle; wherein said apparatus controls the electric motors that drive the wheels of said electric vehicle.

It is a further object of this invention to disclose such an apparatus as defined in any of the above, adapted for use in a projectile device; wherein said apparatus controls the electric motors within said projectile device.

It is a further object of this invention to disclose a projectile device, comprising (a) a payload; (b) a plurality of DC motors; and (c) a control apparatus as defined in any of the above. It is within the essence of the invention wherein said pulse-width modulated signal is used to control independently and to optimize the current used to alter at least one parameter chosen from the group consisting of (a) the axial position of each of said DC motors; (b) the linear position of each of said DC motors; and (c) the speed of each of said DC motors.

It is a further object of this invention to disclose a projectile device, comprising (a) at least one canard wing (fin); (b) a plurality of DC motors; and (c) a control apparatus as defined in any of the above. It is within the essence of the invention wherein said pulse-width modulated signal is used to control independently and to optimize the current used to alter at least one parameter chosen from the group consisting of (a) the axial position of each of said DC motors; (b) the linear position of each of said DC motors; and (c) the speed of each of said DC motors.

It is a further object of this invention to disclose such a projectile device, further comprising a payload.

It is a further object of this invention to disclose a projectile device as defined in any of the above, wherein said projectile device is chosen from the group consisting of smart artillery and rocket.

BRIEF DESCRIPTION OF THE DRAWINGS

The invention will now be described with reference to the accompanying drawings, wherein.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

As used herein, the term "position" without specific modification may refer to either the position of an object in space, or its position (orientation) with respect to a particular axis.

As used herein, the term "linear position" refers to the position in space of an object along at least one axis with respect to a defined origin.

As used herein, the term "axial position" refers to the orientation of an object with respect to a defined orientation axis, in particular, the angle between a defined axis of the object and the defined orientation axis.

In the following description, a reference number followed by a letter indicates a specific member of a plurality of substantially identical elements (e.g. motors or wheels). A reference number followed by the letter "x" refers to a generic element of a plurality of substantially identical elements.

Figure 1:
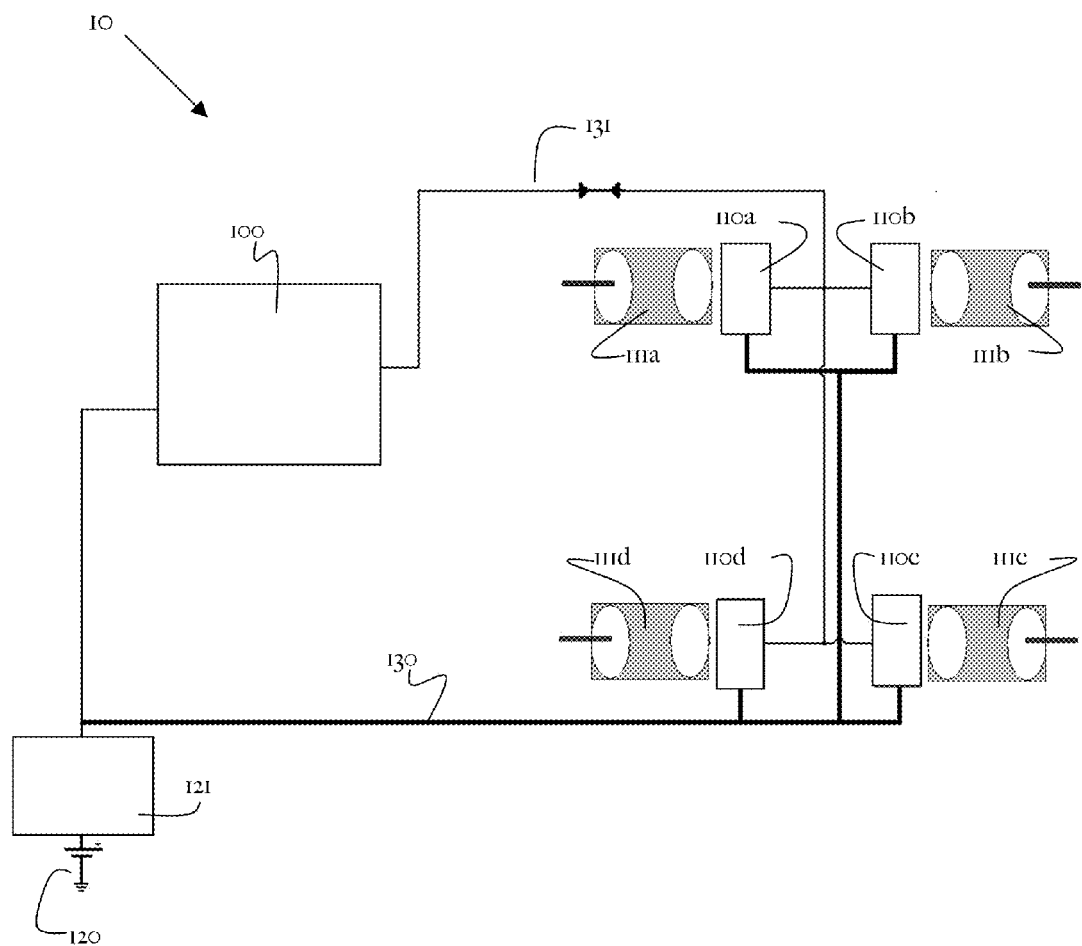
FIG. 1 presents a schematic diagram of the MAMC system according to one embodiment of the present invention.

Reference is now made to FIG. 1, which presents a schematic diagram of a typical embodiment 10 of the invention herein disclosed. The invention comprises two basic elements: a single ASIC or FPGA multi-axis motor controller (MAMC) 100 that controls the motor drivers, and a plurality n of MAMC agents 110. Each MAMC agent 110x controls the low-level signals and information passed to and from the associated motor 111x. In particular, the MAMC agent manages the power bridge to the motor winding of its associated motor and reads the actual current being drawn by the motor at any given time. In the embodiment shown, n=4, and each wheel a-d (not shown in the diagram) is controlled by an associated motor 111a-111d, in communication an associated MAMC agent 110a-110d. MAMC 100 comprises a CPU, memory, a BLDC communication controller, an I/O controller, and a synchronized pulse-width modulation (PWM) controller. The MAMC controls actions along all axes along with the closing speeds of all sections of the system. PWM signals are passed via the MAMC agents to bridges that run the motors. A detailed description of the architecture of the MAMC is given below. Power is supplied to the motors by electricity source 120 (in preferred embodiments, the source of electricity is a battery) and optional step-up power converter 121. The system comprises separate buses for battery power (130) and for high-speed communication buses (131). These buses may be of any type known in the art. In a preferred embodiment of the invention, the high-speed communication bus is a FLEXRAY bus. Each MAMC agent 110x activates the signals to its associated bridge, but the instructions and timing are received from the media instead of directly. Thus, the PWM signals to the motors do not travel the length of the vehicle, but rather only from each MAMC agent 110x to nearby motor 111x, reducing the need for the thick cables necessary to carry high currents. Not only does this system of decentralized connections enable transport of high current by one pair of cables with a thin control cable alongside the thick electric current cables, but the generation of high current PWM pulses near the motor 111x reduces the amount of RF/EMI noise in the system.

Figure 2:
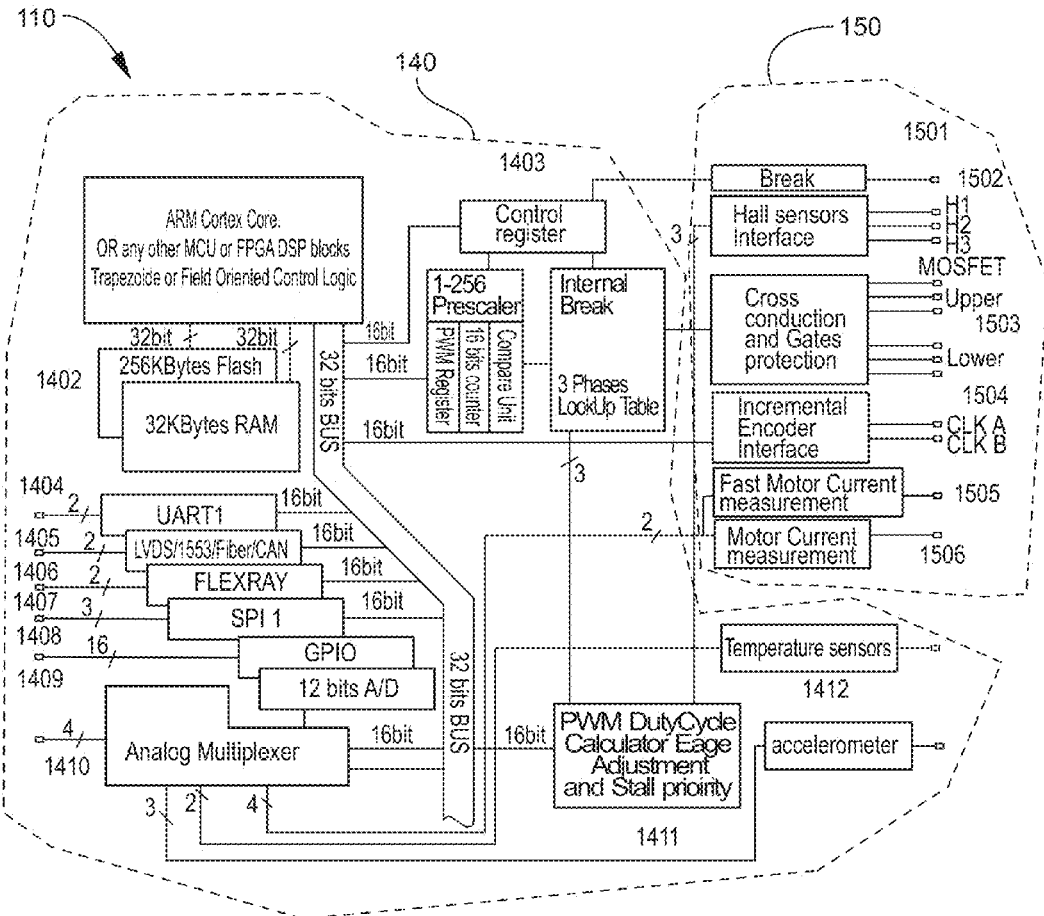
FIG. 2 presents a block diagram of the architecture of MAMC agent 110 according to one embodiment of the present invention.

Reference is now made to FIG. 2, which presents a block diagram of the architecture of one embodiment of MAMC agent 110. The MAMC agent comprises two general components, a control unit 140 that sends and receives data to and from MAMC 100, and a motor interface 150 that controls motor 111. 1401 is the processor of MAMC agent 110; the processor is responsible for communication and calculations. The component's memory 1402 comprises both RAM and non-volatile memory. A system of registers 1403 controls the order of displacement of the phases of the PWM duty cycle. These values are updated via control group calculations. In some embodiments of the invention, the MAMC agent further comprises channel 1404 (UART) for serial networking and receiving the set point instructions as well as for accepting debugging information. In some embodiments of the invention, the MAMC agent further comprises communication bus controller 1405, which is a serial communication channel. Each channel can individually maintain high speed communication with MAMC 100. The control unit also comprises controller 1406 for the high-speed communication bus (in the preferred embodiment illustrated in the figure, this is a FLEXRAY bus). In some embodiments of the invention, the MAMC agent further comprises SPI channel 1407 for synchronized serial communication for support of the circuit components and for accepting set point instructions and for status control. GPIO (1408) is for I/O of interrupts, counters, digital ports, etc. Control unit 140 comprises, in addition, an A/D converter 1409 for analog commands, voltage measurement, motor current output, etc. The A/D converter includes multiplexer 1410 for multiplexing a plurality of analog inputs. In preferred embodiments, the multiplexer can accept at least 16 analog inputs. Control unit 140 also comprises PWM and current management section 1411. Sensors 1412, present in preferred embodiments of the invention, provide information to the multiplexer about the current state of the motors. The embodiment shown in FIG. 2 comprises at least one temperature sensor for enabling protection against overheating of the system and at least one accelerometer capable of measuring acceleration along at least one axis for enabling control of braking and protection against slipping or skidding.

The motor interface unit includes an emergency stop 1501 for the motors. It additionally comprises a BEMF/Hall sensor interface 1502 which is the input for the feedback level of the rotor position of the motors. Gate drivers 1503 provide cross conduction protected output signals to the power bridge. There is also an input section 1504 for multiple motor feedback signals. The current measurement for motors and batteries and protection of the bridge transistors occurs at the "fast current sense" 1505. The "current sense" 1506 is for fine current measurement after integration of internal current loops.

Figure 3:
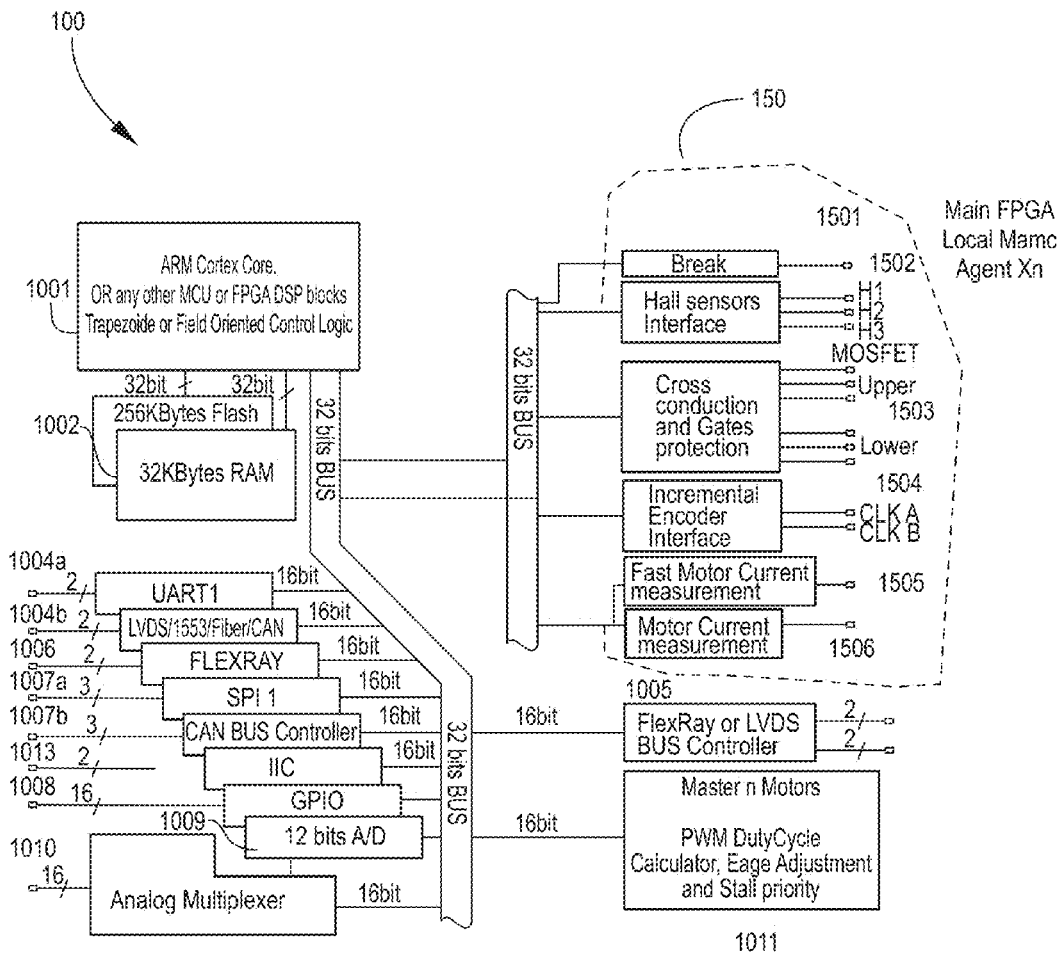
FIG. 3 presents a block diagram of the architecture of MAMC controller 100 according to another embodiment of the present invention.

Reference is now made to FIG. 3, which shows a block diagram of the architecture of MAMC 100 according to a preferred embodiment of the invention. Elements 1001-1010 of the MAMC are communication elements to the computer that controls the vehicle itself. These elements are analogous to elements 1401-1410 of the control unit of MAMC agent 110. In the embodiment illustrated in the figure, two separate UART channels are provided (1004a and 1004b, respectively); in this embodiment, UART channel 2 (1004b) accepts debugging information. In this embodiment, the main communication to the CAR Bus controlled by bus controller 1006 is a CAN bus. In the embodiment illustrated in FIG. 3, the control unit comprises two SPI channels 1007a and 1007b as well as an IIC channel 1013 for serial communication and or onboard serial event logger and/or battery and stability protocol.

In order to enable control of the PWM signal with sufficiently exact timing, a rapid, two-way, essentially deterministic communication channel, that is, one that provides rapid control commands with substantially constant timing is necessary. While it is possible to use communication protocols such as CAN or Ethernet, in order to obtain a deterministic protocol, a protocol in TDMA format is required. Thus, for every MAMC agent, there will be a fixed time slot. Transfer of current conditions from MAMC 100 to MAMC agent 110x is performed when the "status and actual data" are passed from the MAMC agent to the MAMC. In preferred embodiments of the invention, the current conditions are passed according to a protocol well-known in the art such as FLEXRAY or CAN. The bus connection is a star connection in order to maximize the trustworthiness of the signals being passed. As described above, in preferred embodiments, there are two independent communication channels to provide full redundancy.

The invention herein disclosed provides the user with the ability to control the current use from the battery that powers the plurality of motors. The heart of this control is the use of synchronized PWM. The invention herein disclosed enables control of the frequency, position (alignment) and width of the PWM signals to each motor and to each phase of each motor, in order to utilize the entire potential of the battery such that the current drawn from the battery will not be too high at one point and too low at another. Since the current drawn by each motor is a cyclic function, the total current drawn from the battery will be a function of the relative phases of the motors, and thus providing control of the relative phases of the motors provides a means for controlling the total current drawn as a function of time. The PWM provides appropriate phase distribution to enable any desired time-dependent total current, whether a constant low current or a series of current pulses. In a preferred embodiment, an essentially constant total current is achieved by use of variable frequency PWM. The use of a variable frequency for the PWM pulses ensures that current is drawn from the battery over the entire duty cycle of the PWM signal. When the desired time-dependent current is pulsed rather than continuous, all of the aspects of the pulses (maxima, shapes, durations, and timing including the time between pulses) can be controlled by appropriate programming of the PWM signals (e.g. pulse widths, pulse timing, etc.). The synchronized PWM system herein disclosed thus also provides a means for insuring that the instantaneous current drawn never exceeds a predetermined maximum, or for that matter falls below a predetermined minimum. This methodology has the additional benefit of extending battery life. It is well-known that the lifetime of a rechargeable battery is strongly affected by its time-dependent current output, i.e. high-peak current pulses vs. low steady current. The present invention enables the user to control the current drawn by the motors in any fashion most appropriate to the particular battery being used.

Figure 4:
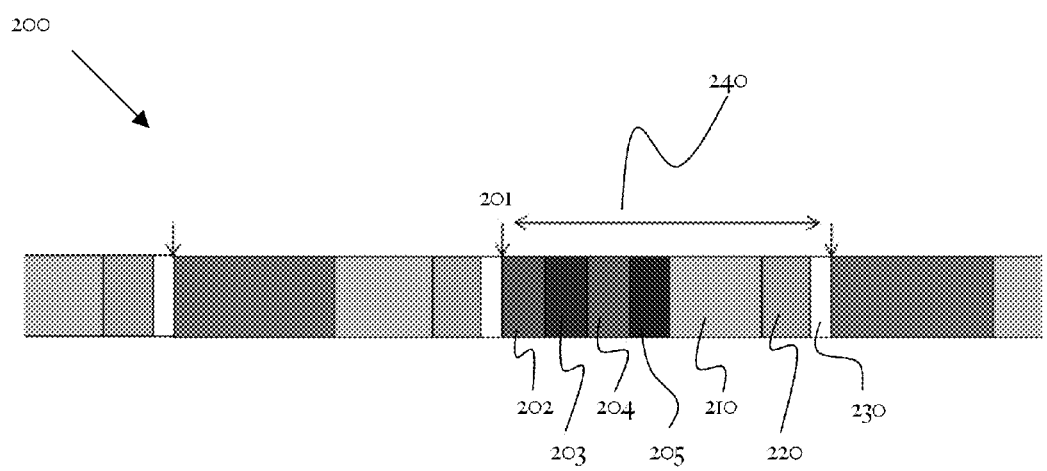
FIG. 4 presents schematically the timing cycle according to one embodiment of the invention.
Figure 5:
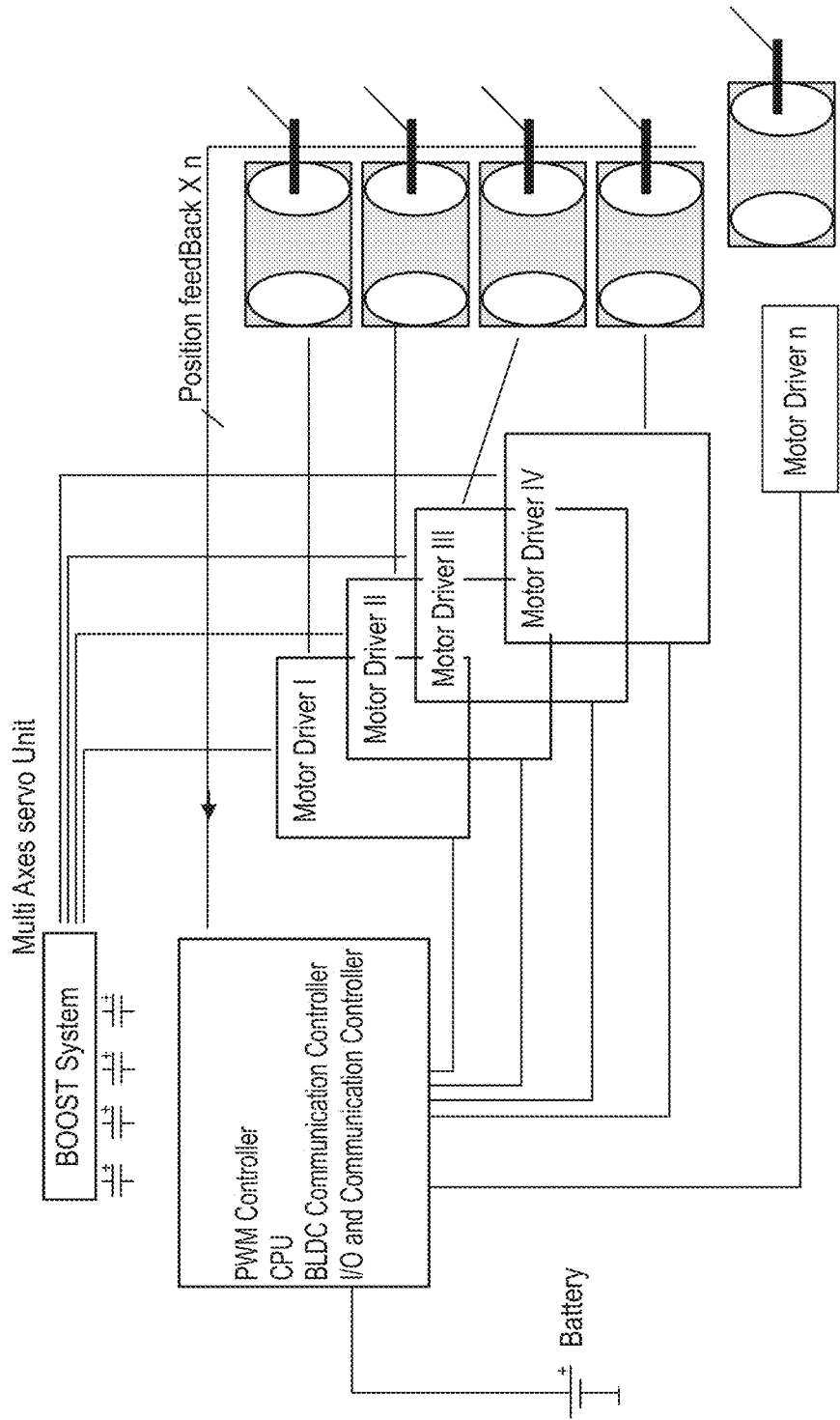
FIG. 5 presents a general schematic of the device for control of n motor drivers according to one embodiment of the invention.
Figure 6:
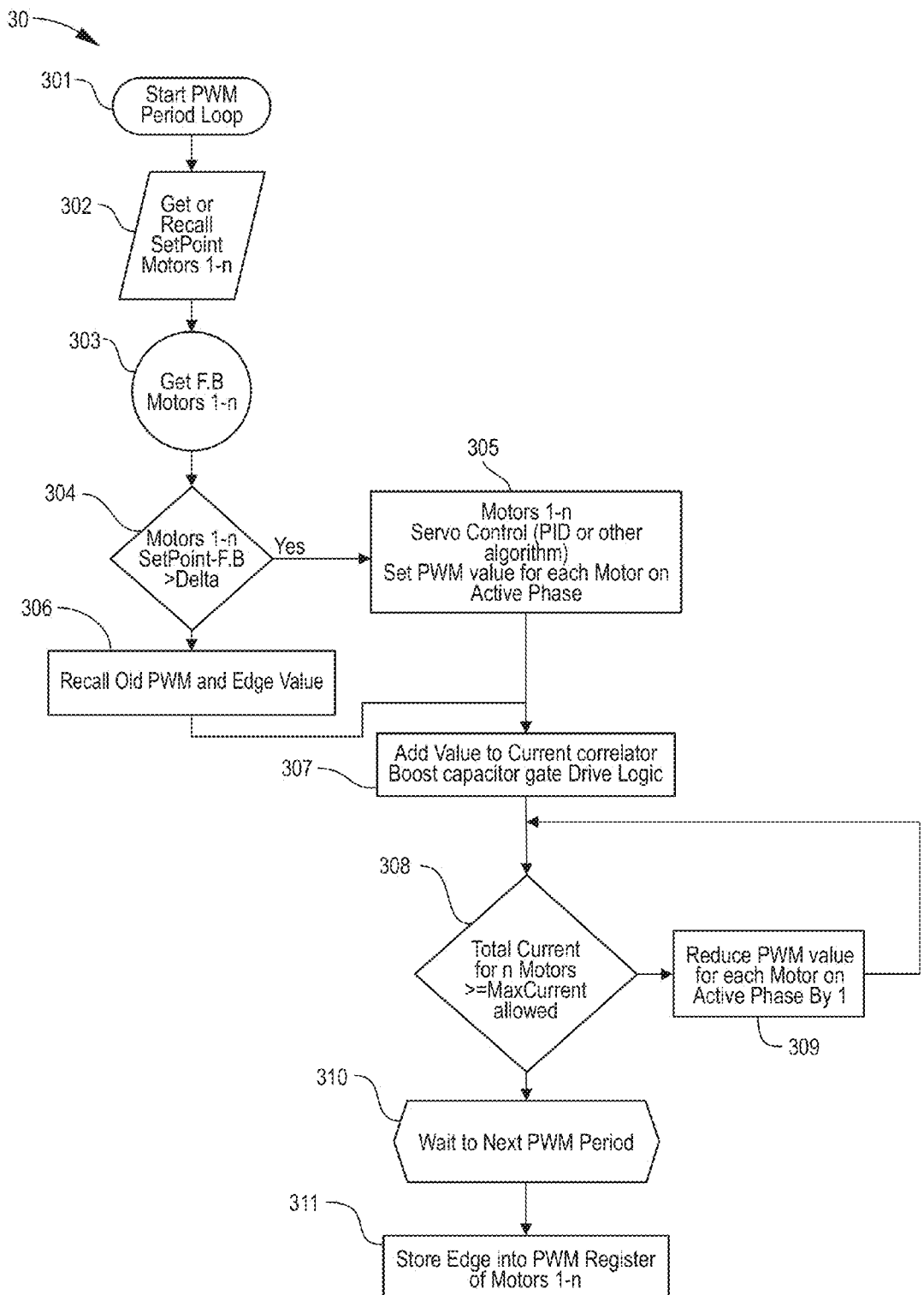
FIG. 6 presents shows a flow chart illustrating a control loop according to one embodiment of the invention.

Reference is now made to FIG. 4, which presents a schematic diagram of the timing cycle 200 for an exemplary embodiment of the invention herein disclosed. The x-axis represents time; a complete cycle, indicated by the horizontal arrow 240, is typically between about 25 μs and about 500 μs. The start of each cycle is indicated by a vertical arrow 201. Segments 202-205 of the timing cycle represent a series of n "static segments"; in the embodiment illustrated in the figure, n=4. The static segments are reserved slots for deterministic data that arrives at a fixed period from each of the n MAMC agents. The static segments are followed by a dynamic segment 210, which is used for event-based data that does not require determinism. The dynamic segment is followed by a symbol window 220, which is used for network maintenance and signaling for starting the network. Finally, the active segments are followed by network idle time 230, which is a preset time used to maintain synchronization between node clocks.

The method disclosed herein can be adapted, with appropriate phase correction, for m-pole motors where m is any integer greater than 1, and for any type of driving voltage waveform (trapezoidal, sinusoidal, etc.). Furthermore, the method and system as disclosed herein do not depend on the use of the specific methods of communication described in the preferred embodiments. In additional embodiments of the invention, any means of communication known in the art capable of transmitting the PWM signals to the motors can be used.

In additional embodiments of the invention, it is adapted for use in an electric vehicle. In these embodiments, each of the plurality of electric motors controls one of the wheels of the vehicle. In addition to control of the current drawn by the motors from the battery that serves as the source of electricity as described above, the invention herein disclosed provides control in dynamic situations. In some embodiments of the invention, additional sensors are associated with the motors. These sensors may be temperature sensors that provide the control system with information necessary to prevent overheating.

In preferred embodiments, the system includes accelerometers capable of measuring acceleration along at least one axis (in the most preferred embodiments, accelerometers capable of measuring acceleration in three dimensions) and/or sensors that measure slippage. In some embodiments, rather than sensors that measure slippage directly, the slippage is calculated from measurements of the motion of the vehicle (e.g. from measurements made by the accelerometers). As a non-limiting example, an inconsistency between the measured motion of at least one wheel and the measured motion of the vehicle itself may be an indication of slippage or skidding. By providing feedback about the current status of the motion of the wheels to the MAMC, these sensors enable the MAMC to react to potentially dangerous situations. For example, the MAMC can automatically act as a braking system by providing PWM signals that reverse the direction of the motors.

These braking signals are only sent when, e.g., the accelerometer, slippage monitor, or means for calculating slippage based on the accelerometer readings reports values outside of present limits. Since the MAMC provides pulsed signals, the system inherently behaves in a manner analogous to that of anti-lock braking systems known in the art.

In additional embodiments of the invention, the invention provides methods and means for using a PWM signal protocol to control not only the electric current drawn by a system comprising a plurality of motors, but for control of the motors themselves as well.

In the embodiments heretofore described, control signals pass from the MAMC controller to the motors via MAMC agents. In embodiments of the invention in which the physical distance between motors and the MAMC controller is not large, or in which the total current drawn by the motors is not large, the control signal passes directly from the MAMC controller to the motors without the necessity for a set of MAMC agents. A non-limiting example of such an embodiment is the use of the invention herein disclosed to control motors that control the positions and speeds of canards (fins) of a projectile such as a guided missile.

Figure 9:
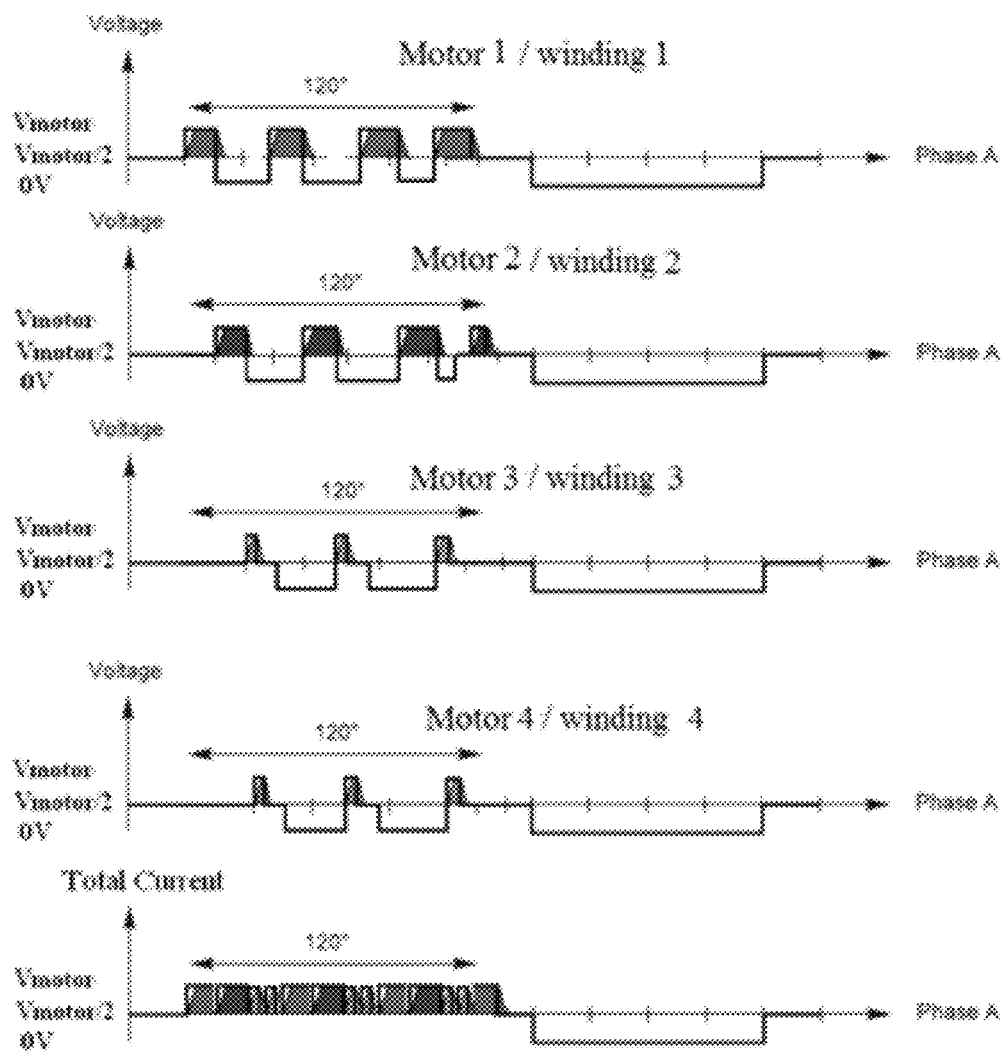
FIG. 9 presents a synchronized PWM voltage/current time division scheme, according to one embodiment of the present invention, for control of four motors; and, FIG. 10 presents synchronized PWM voltage/current time division schemes, according to different embodiments of the present invention, for control of four motors using either fixed frequency PWM or variable frequency PWM.

Reference is now made to FIG. 9, a general schematic block diagram of one embodiment of the present invention, for control of multiple motors, is presented. A battery or other power supply provides the current to the servomotor drivers. A single component (ASIC or FPGA) controls the entire series of motor drivers, each of which independently controls the axial or linear motion or the speed of a particular motor. As with the embodiments in which current control is provided, in these embodiments, this single integrated control component comprises a CPU, a PWM controller, a commutation controller (in the case of brushless DC motors) or a full bridge (for brush DC motors), I/O and communication channels. For each of the n motors there is a boost capacitor which holds an extra energy reserve. Each of the n motor drivers contains a feedback circuit (e.g., a resolver, a potentiometer encoder, or similar device) such that the position of each motor relative to a predetermined set point is reported back to the control component. The deviation from the set point is then determined, and the controller then sends to each servomotor the current necessary to bring it to its set point, according to the control logic loop described below.

Figure 10:
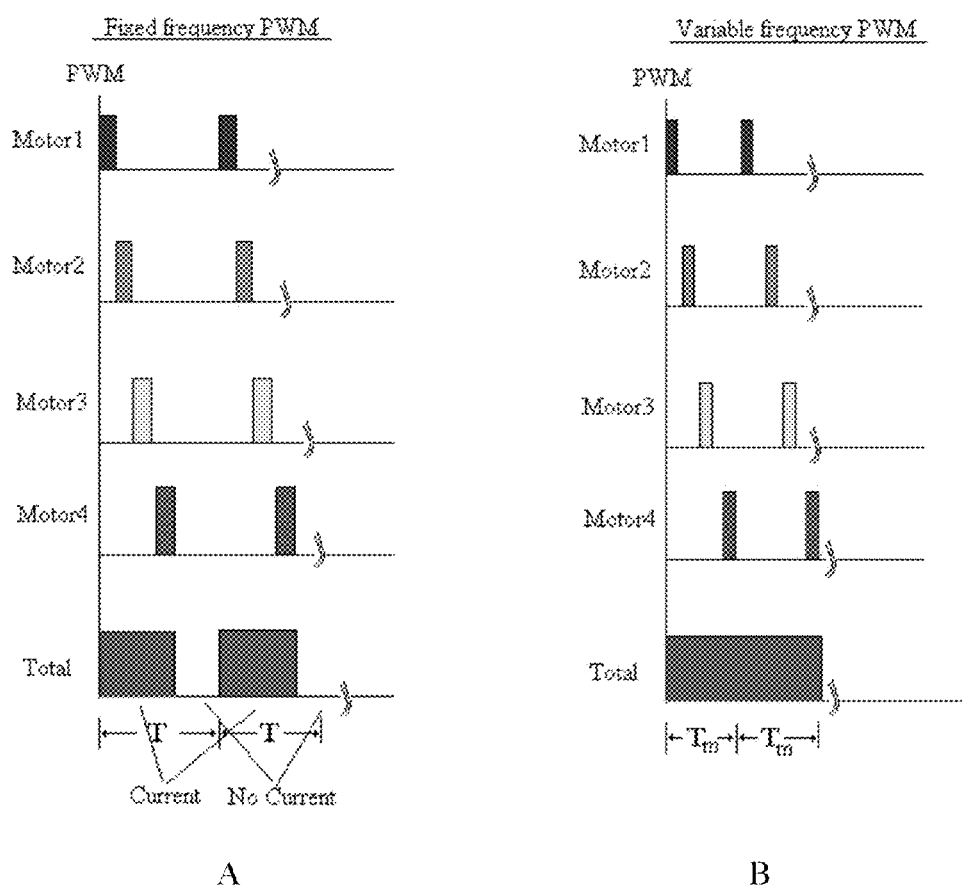

Reference is now made to FIG. 10, which presents as a flow chart the control sequence 30 according to one embodiment of the invention. Step 301 is the point at which the PWM period loop is entered. Note that the rate of repetition of the PWM control loop is not necessarily the same as that of the set point control. Given the nature of PWM, the PWM control loop rate can be (and in most cases will be) much higher than the rate of updating the set point control. In step 302, the set points for motors 1, 2, 3 . . . n are retrieved. If the repetition rate of the control loop is not equal to the rate of updating the set point control, then the set point is retrieved from memory (i.e. it remains the same as in the previous PWM loop). In step 303, the feedback conditions are read by the system. Step 304 tests, for each motor, whether the difference in the axial position between the set point and the position returned by the feedback loop (D) is greater than a preset value (Δ). For each motor for which D>Δ, the servo control is set (via PID or any other appropriate algorithm) to deliver the amount of current necessary to bring that motor to the set point position (step 305); if not, the previous PWM and PWM Edge values are retrieved (step 306). Following this decision step, step 307, addition of the value of the current returned in the previous step (305 or 306) is added to the current correlator and a decision if extra capacitors current boost is needed. Step 308 is another decision step, in which the total current needed (as determined in step 307) is compared to the maximum current allowed. If it is, then step 309 is performed: for each motor in the active phase (as determined by the PWM signal), the PWM value is reduced by one, and the system returned to step 308. When the total current needed is less than the maximum current allowed (possibly after a single iteration of step 308, or after multiple iterations of reducing the PWM value), the system proceeds to step 310, waiting for the next PWM period. The wait period is followed by storage of the PWM edge value for each of the n motors into the appropriate PWM register (step 311), and the entire process is repeated, starting with step 301.

Figure 7:
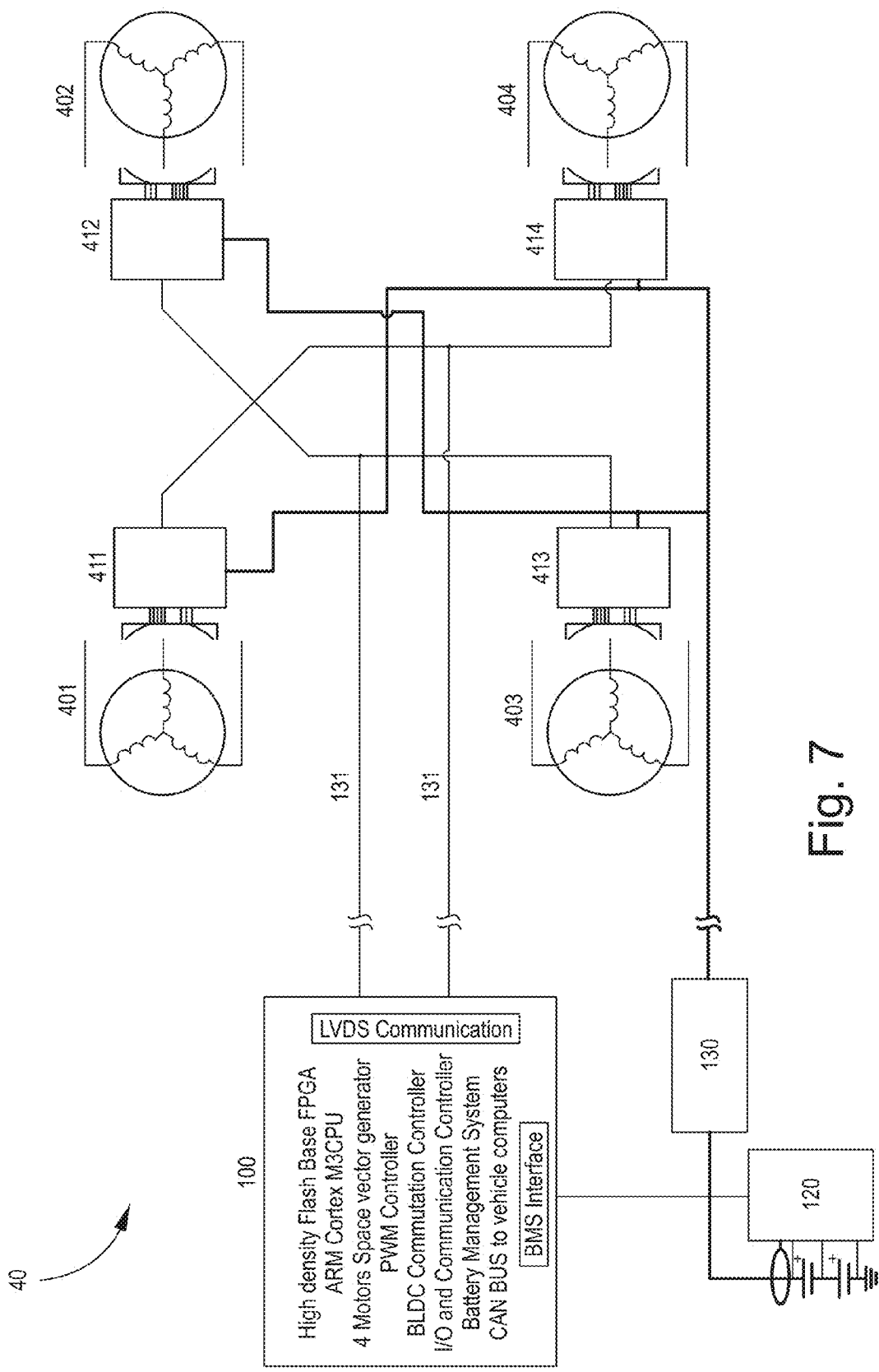
FIG. 7 presents a schematic diagram of the device for control of a single motor with a plurality of windings according to one embodiment of the invention.

In additional embodiments of the invention, rather than controlling multiple motors, each of which has a single winding, the method is adapted for controlling at least one motor with multiple windings. Reference is now made to FIG. 7, which shows a schematic block diagram of an embodiment 40 in which MAMC master 100 controls a plurality of windings (in the specific embodiment shown, the motor comprises four windings 401-404). As can be seen in the drawing, the basic architecture of the system remains the same. In the case of embodiments with a multiple-winding motor, the "MAMC" master controls multiple windings rather than multiple axes, and since there is only one motor, a plurality of MAMC agents is not necessary, however. Rather, the individual windings are controlled from a central controller and instead of "MAMC agents," control signals are passed to the winding by a plurality of bridge drivers (411-414, respectively) controlled by a central logic bridge.

Other dynamic situations in which the method herein disclosed will provide automatic control to the electric vehicle by control of changes in the current drawn by each motor (and hence the power being used to drive each wheel) that is much more rapid than a human driver of the vehicle would be capable of will be clear to those skilled in the art.

EXAMPLE 1

Figure 8:
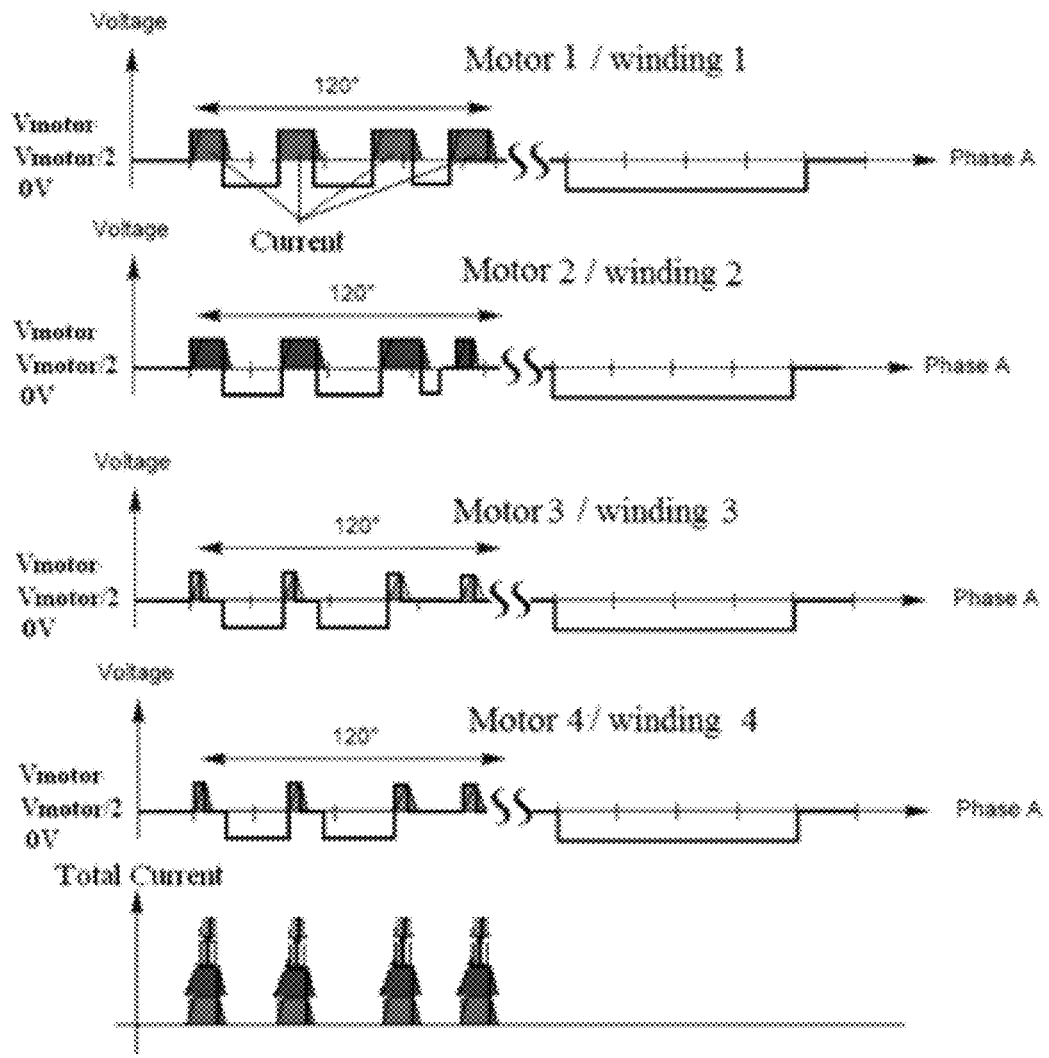
FIG. 8 presents an unsynchronized PWM voltage/current time division scheme, of a type known in the art, for control of four motors.

Reference is now made to FIGS. 8 and 9, which illustrate one embodiment of the invention and provide a non-limiting example of how the invention may be used in practice. In the example, a PWM provides timing for four motors. For simplicity of presentation, 4-pole motors are used (each phase is thus 120°). Note that not all of the motors need have the same number of poles. In this example, the 4-pole motors rotate at $10^4$ rpm (166.6 Hz). The phase thus changes every 0.5 ms. FIG. 8 shows the system behavior for an unsynchronized PWM. The upper four graphs show the voltage on each motor as a function of time. In this example, the PWM runs at 20 kHz (i.e. 10 PWM cycles per phase change). Since each motor operates independently, the system does not "know" the PWM timing. Thus, it is possible for all of the motors to be on the same phase, as shown in the figure. The PWM will therefore be high, and as a result, the battery supplies pulses of high current. After about 25 μs, the PWM goes to the low state, and the total current is zero. This behavior in the total current as a function of time is shown in the lowest graph. For most applications, this behavior is not ideal and will shorten the lifetime of the battery.

The effect of using synchronized PWM according to one embodiment of the present invention is illustrated in FIG. 9 for the same system of motors and PWM frequency as in FIG. 8. As shown in FIG. 9, the use of synchronized PWM can be used to define any desired set of relative phases among the motors. In this particular example, it defines a total current profile that is characterized by a constant current. Thus, use of synchronized PWM can be used inter alia to ensure that the total current that the system of motors attempts to draw from the current source never exceeds the maximum that the current source can supply.

EXAMPLE 2

Reference is now made to FIG. 10, which illustrates the use of variable frequency PWM as a means of providing an essentially constant current from the motor. FIG. 10A illustrates a typical application of fixed frequency PWM in which the current required by the system over a single cycle is less than that which the system is capable of providing. As a result, there will be a "dead time" between cycles, as illustrated in the figure. In contrast, FIG. 10B illustrates the use of variable frequency PWM to provide constant current. The frequency is chosen such that a duty cycle of 100% is achieved with no dead time between cycles. As the electrical needs of the system change with time, the PWM frequency is changed to reflect the needs of the system at any given time. As a result, an essentially constant current is drawn. A major advantage of the use of variable frequency PWM is that the current drawn from the source of electricity has essentially no AC component. Thus, variable frequency PWM significantly limits the RF signal produced by the motor control system relative to systems currently used and known in the art.

What is claimed is:

1. A method for using pulse-width modulated signals in the control of the electric current drawn from a source of electricity by a system comprising:
   a single central controller configured to provide synchronized pulse-width modulated (PWM) signals;
   a motor subsystem chosen from the group consisting of
   a plurality of electric motors each of which has a single winding;
   at least one electric motor with multiple windings; and,
   a plurality of electric motors, at least one of which has multiple windings;
   in cases in which said motor subsystem comprises a plurality of electric motors:
   measuring means for measuring the current being drawn by each of said plurality of electric motors;
   current controlling means for controlling the current being drawn by each of said plurality of electric motors;
   in cases in which said motor subsystem comprises at least one motor with multiple windings:
   measuring means for measuring the current being drawn by each of said windings;
   current controlling means for controlling the current being drawn by each of said windings;
   and,
   transmitting means for transferring signals between said central controller and said current controlling means;
   wherein said method comprises:
   in cases in which said motor subsystem comprises motors with single windings, measuring separately current being drawn by each of said electric motors with a single winding;
   in cases in which said motor subsystem comprises motors with multiple windings, measuring separately current being drawn by each winding of said motors with multiple windings;
   transmitting to said central controller, according to a predetermined sequence, a plurality of signals, each one of said plurality of signals corresponding to the current being drawn by one of said of motors with a single winding or to the current being drawn by one of the windings of each of said motors with multiple windings;
   transmitting, according to a predetermined sequence, at least one PWM signal from said central controller to each of said current controlling means, each of said at least one PWM signal corresponding to the amount of current to be drawn by said motor or said winding, whereby the relative phases and durations of said at least one PWM signals are distributed according to a predetermined protocol; and,
   repeating the previous three steps while said motors are in operation;
   whereby the distribution of PWM signals defines the total current drawn from said source of electricity as a function of time.

2. The method according to claim 1, wherein said central controller is adapted to provide signals chosen from the group consisting of (a) PWM signals and (b) timing signals, wherein the distribution of signals provided by said central controller defines the total current drawn from said source of electricity as a function of time.

3. The method according to claim 1, wherein said system further comprises a plurality of MAMC agents in cases when said motor subsystem comprises a plurality of motors, each of said MAMC agents adapted to transfer signals to and from said central controller and to control at least one of said motors, and said system further comprises a logic bridge and driver in cases when said motor subsystem comprises a motor with multiple windings, said logic bridge and driver adapted to transfer signals to and from said central controller and to control at least one of said windings, and further wherein said method further comprises steps of:
   transmitting, according to a predetermined sequence, a plurality of signals, each one of said plurality of signals corresponding to the current being drawn by one of said plurality of motors, from at least one of said plurality of MAMC agents to said central controller when said system comprises a plurality of MAMC agents, and from said logic bridge and driver when said subsystem comprises a logic bridge and driver;
   transmitting at least one signal from said central controller to each of said plurality of MAMC agents when said system comprises a plurality of MAMC agents, each of said signals corresponding to the amount of current to be drawn by the motor being controlled by the agent receiving said signal, whereby the relative phases and durations of said signals are distributed according to a predetermined protocol;
   transmitting at least one signal from said central controller to said logic bridge and driver when said system comprises a logic bridge and driver, each of said signals corresponding to the amount of current to be drawn by the winding being controlled by the driver receiving said signal, whereby the relative phases and durations of said signals are distributed according to a predetermined protocol; and,
   repeating the previous steps while said electric motors are in operation;
   wherein the distribution of PWM signals defines the total current drawn from said source of electricity as a function of time according to a predetermined protocol.

4. The method according to claim 3, wherein said central controller is adapted to provide signals chosen from the group consisting of (a) PWM signals and (b) timing signals, wherein the distribution of signals provided by said central controller defines the total current drawn from said source of electricity as a function of time.

5. The method according to claim 1, wherein said distribution of PWM signals defines the total current drawn from said source of electricity according to a protocol chosen from the group consisting of (a) substantially constant; (b) a series of pulses, the maxima, durations, timing, and shapes of which are determined according to a predetermined protocol; and (c) a series of pulses, the maxima, durations, timing, frequency and shapes of which are determined according to a predetermined protocol.

6. The method according to claim 5, wherein said distribution of PWM signals comprises a series of pulses chosen from the group consisting of (a) a series of pulses produced at a predetermined fixed frequency and (b) a series of pulses produced at a variable frequency.

7. The method according to claim 6, wherein said variable frequency is produced according to a predetermined protocol whereby the current drawn from said source of electricity is substantially constant with time.

8. The method according to claim 1, wherein said distribution of PWM signals defines the total current drawn such that the total instantaneous current does not exceed a predetermined maximum value.

9. The method according to claim 1, wherein said distribution of PWM signals defines the total current drawn such that the total instantaneous current does not fall below a predetermined minimum value.

10. The method according to claim 3, wherein said step of transmitting, according to a predetermined sequence, a plurality of signals further comprises steps of:
defining a network cycle comprising at least one segment during which data is transmitted;
defining static segment within each network cycle, said static segment comprising a fixed period of time during which deterministic data is transmitted; and,
transmitting said plurality of signals sequentially from said plurality of agents during each static segment.

11. The method according to claim 10, further comprising an additional step of transmitting data in a dynamic segment following said static segment within each network cycle.

12. The method according to claim 11, further comprising an additional step of transmitting network maintenance and/or timing signals during a symbol window following said dynamic segment.

13. The method according to claim 10, wherein each network cycle further comprises a predetermined idle time.

14. The method according to claim 13, further comprising a further step of synchronizing node clocks during said idle time.

15. The method according to claim 3, further comprising steps of:
measuring the acceleration along at least one axis;
calculating the slipping rate of at least one of said motors from said measured acceleration; and,
transmitting at least one value obtained in said step of calculating the slipping rate of at least one of said motors from at least one of said plurality of MAMC agents when said system comprises a plurality of MAMC agents, and from said logic bridge when said system comprises a logic bridge, to said central controller.

16. The method according to claim 3, further comprising steps of:
measuring at least one of (a) acceleration along at least one axis, (b) temperature, and (c) slipping rate of each of said electric motors; and,
transmitting the at least one value obtained in the previous step from at least one of said plurality of MAMC agents when said system comprises a plurality of MAMC agents, and from said logic bridge when said system comprises a logic bridge, to said central controller.

17. The method according to claim 16, wherein said motor subsystem comprises a plurality of motors, and further wherein said step of transmitting from said central controller to each of said plurality of MAMC agents at least one signal further comprises the additional step of transmitting a signal to at least one of said plurality of MAMC agents whereby the direction of rotation of at least one of said plurality of electric motors is reversed.

18. The method according to claim 17, wherein said distribution of PWM signals is adapted to reverse said direction of rotation of at least one of said plurality of electric motors whereby braking of said motors occurs without slipping.

19. The method according to claim 1, further comprising steps of:
obtaining a means of providing, for each of said motors, set points for at least one parameter chosen from the group consisting of (a) the axial position of each of said DC motors; (b) the linear position of each of said DC motors; and (c) the speed of each of said DC motors;
obtaining means for determining the actual values of said at least one parameter;
obtaining means for reporting said actual values of said at least one parameter to said central controller;
obtaining means for altering said actual values of said at least one parameter;
obtaining at least one boost capacitor;
setting at least one parameter chosen from the group consisting of (a) the axial position of each of said DC motors; (b) the linear position of each of said DC motors; and (c) the speed of each of said DC motors via a control loop, said control loop comprising steps of:
entering the control loop;
retrieving the desired set point for each of said parameters, said retrieval obtained by memory recall if said set point has not changed since the previous occurrence of step (i), otherwise from said set point control;
reading the feedback conditions;
normalizing the feedback conditions to said set point value;
calculating the error of said at least one parameter to its set point;
calculating, for each of said motors, the amount of electrical current said source of electricity must provide to said means of altering said values of said at least one parameter necessary to bring each of said motors to its set point;
updating, when necessary, each set point provided to said feedback control;
calculating the correlation of the current needed for altering said values of said at least one parameter with the duty cycle value of said PWM signal;
calculating the total current;
correlating the duty cycle for each of said motors with a corresponding initial motion and/or speed;
discharging, if necessary, at least part of the charge stored in said at least one boost capacitor to the gate drive;
storing new values in the PWM register of said integrated control unit for each of said motors; and,
waiting for the next cycle;
wherein in addition to optimizing the electric current use of said system, said method controls independently at least one parameter chosen from the group consisting of (a) the axial position of each of said DC motors; (b) the linear position of each of said DC motors; and (c) the speed of each of said DC motors.

20. The method according to claim 19, wherein said DC motors are brushless DC motors.

21. The method according to claim 1, adapted to control the motors that control the wheels of an electric vehicle.

22. An apparatus for using pulse-width modulated (PWM) signals to provide control to a motor system, said apparatus connectable to a motor system comprising at least one of the group consisting of:
- a plurality of electric motors each of which has a single winding;
- at least one electric motor with multiple windings; and,
- a plurality of electric motors, at least one of which has multiple windings;
- wherein said apparatus comprises, when said motor system comprises a plurality of motors, a multi-axis motor controller (MAMC), said MAMC comprising:
- a single synchronized pulse-width modulation (PWM) controller adapted for providing PWM signals to said plurality of electric motors; and,
- communications means adapted to transmit signals from said MAMC to said plurality of motors and to receive signals transmitted from said plurality of electric motors to said MAMC;
- and further wherein said apparatus comprises, when said motor system comprises a motor with multiple windings, a logic bridge and driver, said logic bridge and driver comprising:
- a synchronized pulse-width modulation (PWM) controller adapted for providing PWM signals to said plurality of electric motors; and,
- communications means adapted to transmit signals from said logic bridge and driver to said windings and to receive signals transmitted from said windings to said logic bridge and driver;
- whereby the relative phases of said PWM signals are distributed according to a predetermined protocol.

23. The apparatus according to claim 22, further comprising at least one boost capacitor in electrical connection with the source of electricity for said electric motors.

24. The apparatus according to claim 22, wherein said predetermined protocol is chosen such that the current demand upon the source of electricity powering said electric motors cannot exceed the maximum current said source of electricity is capable of providing.

25. The apparatus according to claim 22, wherein said communications means comprises a two-way signal bus between said MAMC or logic bridge and said plurality of motors and/or multiple windings.

26. The apparatus according to claim 22, wherein said electric motors are brushless DC motors.

27. The apparatus according to claim 22, adapted for use in an electric vehicle;
- wherein said apparatus controls the electric motors that drive the wheels of said electric vehicle.

28. The apparatus according to claim 22, adapted for use in a projectile device, wherein said apparatus controls the electric motors within said projectile device.

29. A projectile device, comprising:
- at least one of (a) a payload and (b) a canard (fin);
- a plurality of DC motors; and,
- a control apparatus according to claim 22;
- wherein said pulse-width modulated signal is used to control independently and to optimize the current used to alter at least one parameter chosen from the group consisting of (a) the axial position of each of said DC motors; (b) the linear position of each of said DC motors; and (c) the speed of each of said DC motors.

30. The projectile device according to claim 29, wherein the projectile device is chosen from the group consisting of smart artillery and rocket.

* * * * *